US010616091B2

(12) United States Patent
Finn et al.

(10) Patent No.: US 10,616,091 B2
(45) Date of Patent: *Apr. 7, 2020

(54) EXPLORATORY LINKTRACE OPERATIONS IN A COMPUTER NETWORK

(71) Applicant: Cisco Technology, Inc., San Jose, CA (US)

(72) Inventors: Norman W. Finn, Livermore, CA (US); Samer Salam, Vancouver (CA); John Monaghan, Clydebank (GB); Iain McDade, Hamilton (GB); David Alexander Ball, Harpenden (GB); Simon Chatterjee, London (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/127,107

(22) Filed: Sep. 10, 2018

(65) Prior Publication Data
US 2019/0028380 A1  Jan. 24, 2019

Related U.S. Application Data

(60) Continuation of application No. 15/654,054, filed on Jul. 19, 2017, now Pat. No. 10,084,684, which is a
(Continued)

(51) Int. Cl.
H04L 12/751 (2013.01)
H04L 12/721 (2013.01)
(Continued)

(52) U.S. Cl.
CPC ............ H04L 45/02 (2013.01); H04L 12/462 (2013.01); H04L 41/12 (2013.01); H04L 43/10 (2013.01); H04L 45/26 (2013.01)

(58) Field of Classification Search
None
See application file for complete search history.

(56) References Cited

U.S. PATENT DOCUMENTS 5,918,022 A  6/1999 Batz et al.
5,954,462 A  9/1999 Way et al.
(Continued)

FOREIGN PATENT DOCUMENTS

WO  2008/037203  4/2008

OTHER PUBLICATIONS

Recommendation ITU-T Y.1731: OAM Functions and Mechanisms for Ethernet Based Networks, International Telecommunication Union, Feb. 2008, pp. 1-82.
(Continued)

Primary Examiner — Faruk Hamza
Assistant Examiner — Cassandra L Decker
(74) Attorney, Agent, or Firm — Polsinelli PC

(57) ABSTRACT

In one embodiment, an exploratory linktrace is initiated from an initiating network device with an exploratory linktrace message (ELM) having a target address. Each network device receiving the ELM may then propagate the ELM on a plurality of its ports to a plurality of downstream network devices based on the target address. In addition, each receiving network device returns an exploratory linktrace reply (ELR) for each of the plurality of ports, where each ELR is returned according to one or more mechanisms to mitigate stormed replies to the initiating network device.

20 Claims, 11 Drawing Sheets

Related U.S. Application Data division of application No. 14/320,266, filed on Jun. 30, 2014, now Pat. No. 9,742,655, which is a continuation of application No. 12/356,754, filed on Jan. 21, 2009, now Pat. No. 8,767,587.

(51) Int. Cl.
*H04L 12/26* (2006.01)
*H04L 12/24* (2006.01)
*H04L 12/46* (2006.01)

(56) References Cited

U.S. PATENT DOCUMENTS

| | | |
|---|---|---|
| 6,337,861 B1 | 1/2002 | Rosen |
| 6,538,997 B1 | 3/2003 | Wang et al. |
| 6,578,087 B1 | 6/2003 | Garakani et al. |
| 6,687,247 B1 | 2/2004 | Wilford et al. |
| 6,781,959 B1 | 8/2004 | Garakani et al. |
| 6,785,735 B2 | 8/2004 | Garakani et al. |
| 6,850,530 B1 | 2/2005 | Waclawsky et al. |
| 6,868,068 B1 | 3/2005 | Jain et al. |
| 6,885,642 B1 | 4/2005 | Jain et al. |
| 6,898,183 B1 | 5/2005 | Garakani et al. |
| 6,944,130 B1 | 9/2005 | Chu et al. |
| 6,952,421 B1 | 10/2005 | Slater |
| 7,111,073 B1 | 9/2006 | Jain et al. |
| 7,117,273 B1 | 10/2006 | O'Toole et al. |
| 7,149,917 B2 | 12/2006 | Huang et al. |
| 7,171,491 B1 | 1/2007 | O'Toole et al. |
| 7,185,077 B1 | 2/2007 | O'Toole et al. |
| 7,206,288 B2 | 4/2007 | Cometto et al. |
| 7,213,179 B2 | 5/2007 | Song et al. |
| 7,280,486 B2 | 10/2007 | Sur |
| 7,411,965 B2 | 8/2008 | Chu et al. |
| 7,420,927 B1 | 9/2008 | Garakani et al. |
| 7,468,952 B2 | 12/2008 | Takeda et al. |
| 7,590,114 B1 | 9/2009 | Bishara |
| 7,898,982 B2 | 3/2011 | Srichar et al. |
| 2002/0120672 A1 | 8/2002 | Butt et al. |
| 2003/0145105 A1 | 7/2003 | Desineni et al. |
| 2004/0042440 A1 | 3/2004 | McGowan |
| 2006/0195607 A1 | 8/2006 | Naseh et al. |
| 2006/0200862 A1 | 9/2006 | Olson et al. |
| 2006/0218301 A1 | 9/2006 | O'Toole et al. |
| 2007/0014290 A1 | 1/2007 | Dec et al. |
| 2007/0025256 A1 | 2/2007 | Hertoghs et al. |
| 2007/0028147 A1 | 2/2007 | Huang et al. |
| 2007/0121523 A1 | 5/2007 | Morandin |
| 2007/0140126 A1 | 6/2007 | Osswald et al. |
| 2007/0255733 A1 | 11/2007 | Chahal et al. |
| 2008/0019363 A1 | 1/2008 | Katsuya |
| 2008/0232338 A1 | 9/2008 | Ji et al. |
| 2009/0010254 A1 | 1/2009 | Shimada |
| 2009/0180399 A1 | 7/2009 | Li |
| 2009/0232006 A1 | 9/2009 | Mohan et al. |
| 2010/0165883 A1 | 7/2010 | Holness et al. |

OTHER PUBLICATIONS

IEEE Std 802.1ag(TM)—2007: IEEE Standard for Local and Metropolitan Area Networks—Virtual Bridged Local Area Networks: Amendment 5: Connectivity Fault Management, IEEE Computer Society, Dec. 17, 2007, pp. 1-260.

itechtalk.com, "Special Bits on Ethernet MAC Addresses," http://www.itechtalk.com/thread226.html, Nov. 21, 2008.

Fujitsu Network Communications, Inc., "Ethernet Service OAM: Overview, Applications, Deployment, and Issues," http://www.fujitsu.com/downloads/TEL/fnc/whitepapers/EthernetService-OAM.pdf, Oct. 16, 2006.

EXPLORATORY LINKTRACE OPERATIONS IN A COMPUTER NETWORK

RELATED CASES

This Application is a continuation of U.S. patent application Ser. No. 15/654,054, filed on Jul. 19, 2017, now issued as U.S. Pat. No. 10,084,684, which is a divisional of U.S. patent application Ser. No. 14/320,266 filed on Jun. 30, 2014, now issued as U.S. Pat. No. 9,742,655, which in turn, is a continuation of U.S. patent application Ser. No. 12/356,754, filed on Jan. 21, 2009, now issued as U.S. Pat. No. 8,767,587, the contents of which are incorporated herein by reference in their entireties.

TECHNICAL FIELD

The present disclosure relates generally to computer networks, and, more particularly, to tracing topology in computer networks.

BACKGROUND

Identifying and mapping an active topology of a computer network, e.g., a bridged Ethernet network, is a key requirement for service OAM (Operations, Administration, and Management). In particular, certain networks, such as carrier Ethernet (bridged) networks, tend to be complex, large in geographic reach, and often span multiple organizations, and as such, mapping the active topology (e.g., of a given virtual local area network, "VLAN") is a challenging task. Many network management systems (NMS) today rely on polling individual devices (network elements) for the purpose of mapping the active topology of a given service or VLAN. This is an out-of-band operation that is slow, tedious and error-prone. Ideally, it is desirable to be able to build the topology map on a given network element by relying on in-band protocol mechanisms.

As an alternative, the IEEE standard 802.1ag-2007 defines a "Linktrace" protocol, which allows the dynamic discovery of a path between a Maintenance End Point (MEP) and another MEP or a Maintenance Intermediate Point (MIP) on a given VLAN using in-band protocol mechanisms. A network administrator can issue a series of one-by-one Linktrace messages to determine the routes to each MEP that has been discovered, and thus map the network. However, this process suffers from the same set of shortcomings as the NMS polling mechanism mentioned above. In addition, should there be any misconfigurations (e.g., improper MEPs) or if an MEP has failed to "come up" (that is, it was not initially discovered due to being failed/down), then the Linktrace messages will not be propagated properly, and the Linktrace operation is ineffective.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
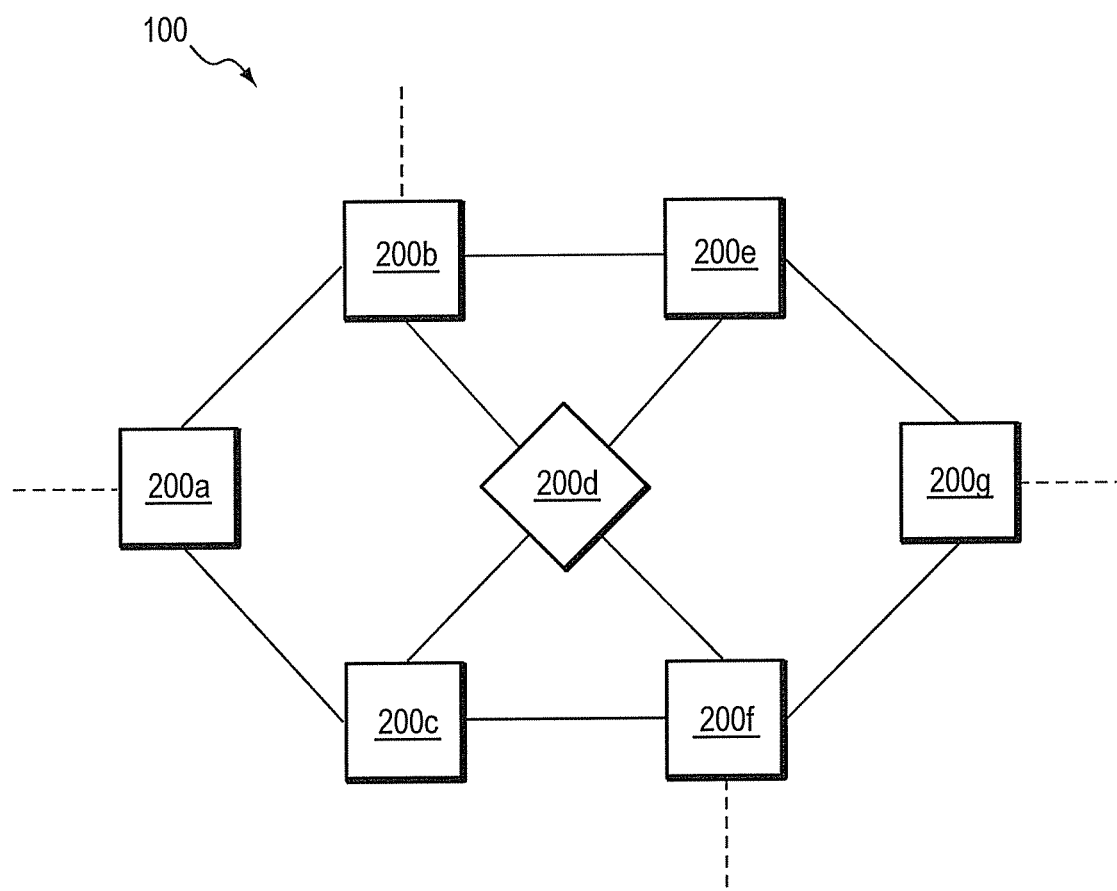
FIG. 1 illustrates an example computer network (e.g., a bridged network)

According to embodiments of the disclosure, an exploratory linktrace is initiated from an initiating network device with an exploratory linktrace message (ELM) having a target address. Each network device receiving the ELM may then propagate the ELM on a plurality of its ports to a plurality of downstream network devices based on the target address. In addition, each receiving network device returns an exploratory linktrace reply (ELR) for each of the plurality of ports, where each ELR is returned according to one or more mechanisms to mitigate stormed replies to the initiating network device.

Also, according to embodiments of the disclosure, the mechanisms to mitigate stormed replies to the initiating network device comprise: concatenating ELRs; dynamically determining a delay in which replies are randomly returned from each network device; and a directed ELM, where the initiating node unicasts a data message to a particular network device that contains an encapsulated ELM, which may be decapsulated and propagated downstream.

DESCRIPTION

A. Network Architecture

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LAN s together and allow the corresponding entities to exchange information. For example, a bridge (or switch) may be used to provide a "bridging" (or "switching") function between two or more LANs. Typically, the bridge is a computer and includes a plurality of ports that are coupled to the LAN s. Ports that are coupled to LAN s that are, in turn, coupled to other bridges are generally referred to as a trunk ports, whereas ports used to couple bridges through LAN s to end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the bridging function, Layer-2 bridges examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

FIG. 1 is a schematic block diagram of an example computer network 100 illustratively comprising nodes/devices, such as bridges 200a-g interconnected by links as shown. Since network 100 comprises bridges, and illustratively operates according to Layer-2, the network 100 may be referred to herein as a "bridged network" accordingly. Those skilled in the art will understand that any number of nodes, devices, links, etc. may be used in the computer network, and that the view shown herein is for simplicity. For example, while the network 100 of bridges is shown as a simple segment of a small number of bridges, the embodiments described herein may also be applicable to "chains" or "rings" of bridges, e.g., large numbers of bridges. Those skilled in the art will also understand that while the embodiments described herein are described generally, they may apply to any network. The computer (bridged) network 100 of FIG. 1 is meant for illustration purposes only and is not meant to limit the embodiments described herein.

Figure 2:
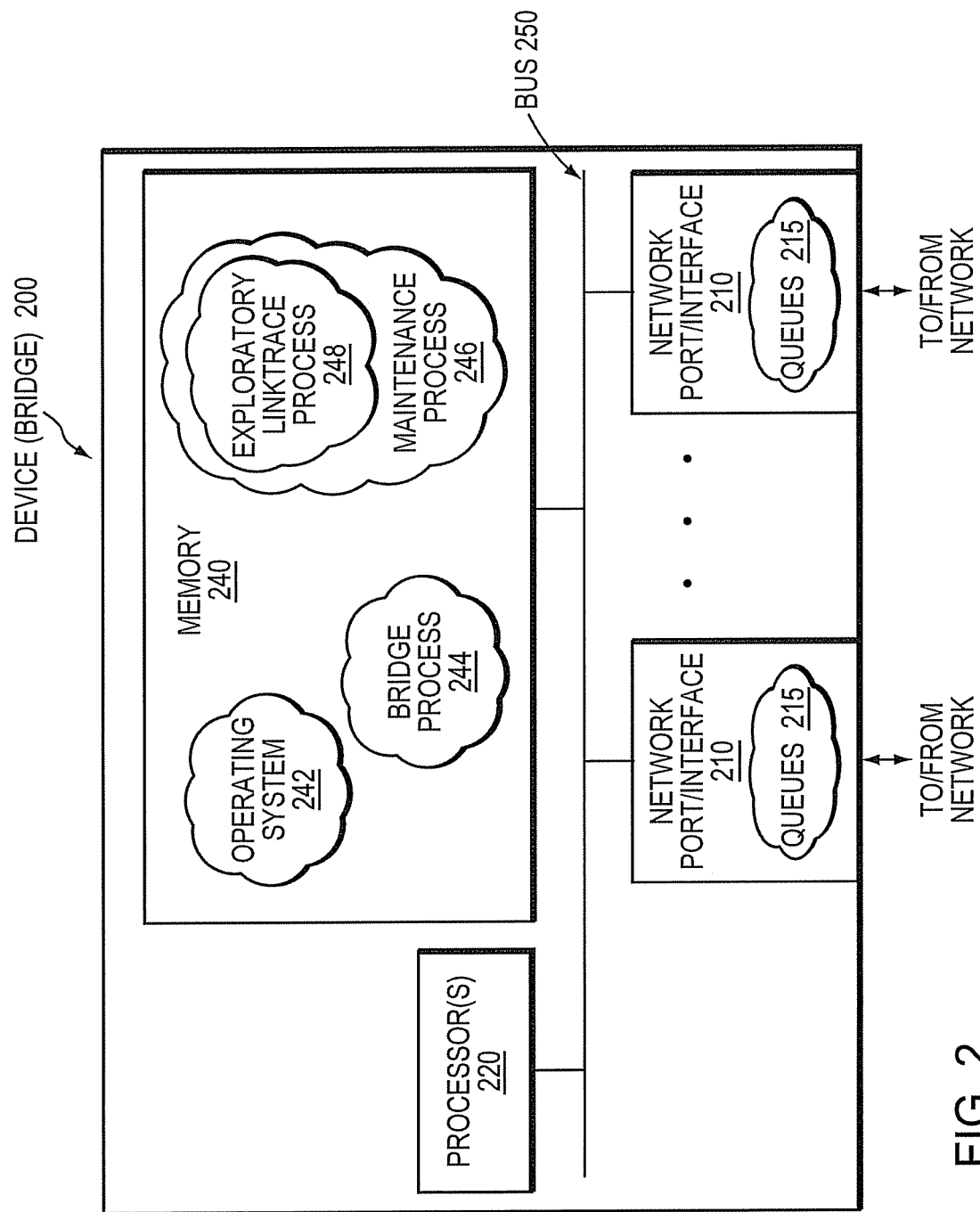
FIG. 2 illustrates an example network device/node (e.g., bridge)

FIG. 2 is a schematic block diagram of an example node/device 200 that may be advantageously used with one or more embodiments described herein, e.g., as a bridge. The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100, particularly on Layer-2. The network interfaces/ports may be configured to transmit and/or receive data (frames) using a variety of different comn1unication protocols over physical links or wireless links, for instance with the use of queues 215 as will be understood by those skilled in the art. For example, such communication protocols may include, inter alia, TCPIIP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack (not shown) that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an illustratively simplified "bridge process" 244, along with an illustrative maintenance process 246 and exploratory linktrace process 248, as described herein. It will be apparent to those skilled in the art that other types of processors and memory, including various computer-readable media, may be used to store and execute program instructions pertaining to the inventive technique described herein.

Bridge process 244 contains computer executable instructions executed by the processor(s) 220 to perform various functions relating to bridges in general, as may be appreciated by those skilled in the art. For instance, a communication process/service of bridge process 244 may perform functions provided by one or more communication protocols, such as various switching/bridging protocols. These functions may be configured to manage switching databases (e.g., spanning tree instances), filtering databases (FDBs), or forwarding information databases (FIBs) containing, e.g., data used to make switching/forwarding decisions. In particular, as part of communication process/services, a spanning tree process may execute to perform functions provided by one or more spanning tree protocols (STPs), such as the known Rapid STP (RSTP) and/or Multiple STP (MST), in addition to the novel techniques described herein. Illustratively, RSTP and MST may be employed on the network devices (bridges) to establish and maintain one or more spanning tree instances, converging the network in response to topology changes.

Maintenance process 246 contains computer executable instructions executed by the processor(s) 220 to perform various functions relating to network maintenance/management in general, as may be appreciated by those skilled in the art, and in accordance with the novel techniques described herein. In particular, with regard to service OAM (operation, administration, and management), the IEEE Std. 802.1ag describes Connectivity Fault Management (CFM) protocols that work together to help administrators debug networks, e.g., Ethernet networks. These protocols include a continuity check protocol, a loop back protocol, and a linktrace (or "link trace") protocol. Briefly, the continuity check protocol describes how "heartbeat" messages may be issued periodically by maintenance end points (MEPs) to allow MEPs to detect a loss of service connectivity amongst themselves and to allow MEPs and maintenance intermediate points (MIPs) to discover MEPs within a domain. Also, the loopback protocol defines how loopback messages may be transmitted by MEPs to verify connectivity to a particular maintenance point (MEP or MIP), similar to a layer-3 "echo" or "ping" message.

Notably, Ethernet CFM, within any given service provider network, relies on a functional model consisting of hierarchical maintenance domains, which are administrative domains for the purpose of managing and administering a network. Generally, maintenance domains may nest or touch, but cannot intersect. If two domains nest, the outer domain must have a higher maintenance level than the one it engulfs. A maintenance domain is defined by provisioning which bridge ports are interior to the domain. For instance, as shown in FIG. 1, interior ports are shown interconnected with solid lines, while exterior ports are shown with dotted lines. The concept of maintenance domains is important due to the different scopes of management that must be provided for different organizations, such as customers, service providers, and operators, as will be understood by those skilled in the art. Moreover, any port 210 of a bridge 200 can be configured as a maintenance point (e.g., MEP or MIP, or a "transparent point" as defined in the protocol). MEPs reside at the edge of a maintenance domain, whereas MIPs are internal to the domain. Hence, an MIP will forward CFM packets (unless it is a CFM message destined for that MIP), while MEPs do not forward CFM packets because they must keep them within the domain. (The only exception to this is when an MEP is also acting as an MIP for a higher-level domain—in which case it will forward CFM packets as long as they are part of the higher-level domain.) Those skilled in the art will understand that while Ethernet CFM networks are described, other computer networks using other manageability models may be used herein, having a domain defined by edge/end and intermediate nodes, accordingly.

As noted above, management systems currently rely on polling individual devices (bridges, or more generally, network elements/devices) for the purpose of mapping the active topology of a given service or VLAN. Generally, this is a slow, tedious, and error-prone operation. As an alternative, the IEEE Std. 802.1ag defines a linktrace protocol, which allows the dynamic discovery of a path between an MEP and another MEP or an MIP on a given VLAN using in-band protocol mechanisms. A network administrator can use the Continuity Check protocol to discover all the MEPs in a network or issue a broadcast loopback message according to other protocols to discover all the MEPs in a network, and then issue a series of one-by-one linktrace messages to determine the routes to each of those MEPs, and thus map the network. Specifically, as described in the standard, linktrace messages may be transmitted by an MEP to track the path (hop-by-hop) to a destination MEP.

In particular, linktrace operation may be performed by sending a linktrace message from an initiating network device (or "initiator") to a destination MEP (with a target address). When the first MIP receives the message, it decrements a time-to-live (TTL) value, forwards the linktrace message to a next downstream MIP (or MEP), and returns a reply message to the initiator that includes the address of the first MIP. The initiating network device thus learns the first MIP on the path to the destination MEP, and may continue to receive subsequent linktrace replies messages with decreasing TTL values and associated MIP/MEP addresses until the path (links) between the initiator and destination MEP has been effectively "traced."

This conventional linktrace operation defined in IEEE Std. 802.1ag, however, suffers from the same set of shortcomings as the NMS polling mechanism mentioned above, such as having to first learn what all the network devices are in a given network, and then perform a linktrace to each network device to map the network to that particular device.

Furthermore, consider the scenario where as part of CFM provisioning, a network administrator forgets to configure an MEP for a given Maintenance Association (MA) or VLAN. This would lead to a "leak" in the associated CFM Maintenance Domain, where CFM frames go to unintended recipients. There is no way to explore the network and discover that dangling path via a conventional linktrace, because the target MAC address is unknown and, moreover, there is no MEP to respond to a broadcast Loopback Message.

Also, a problem exists during a troubleshooting scenario where the network administrator (or dynamic process) is trying to diagnose a connectivity problem for a service when one or more of the devices (sites) failed to ever "come up" (become operational or online). The conventional linktrace does not help in this situation, since the intermediate bridges never heard from the missing MEP(s). In other words, the conventional linktrace protocol relies on service connectivity at some time (i.e., in the absence of live paths, it uses a historical snapshot of the paths to target addresses). Thus, a linktrace message would not be propagated (unknown target address) and fault isolation is thus not possible with existing lag mechanisms.

B. Exploratory Linktrace, Generally

According to embodiments of the disclosure, an exploratory linktrace technique is defined that builds upon and extends the conventional linktrace (e.g., CFM Linktrace) protocol as defined in IEEE std. 802.1ag-2007. The conventional linktrace allows dynamic discovery of the path from a given source MEP to a single destination maintenance point (MEP or maintenance intermediate point, "MIP"). As such, the target of a conventional linktrace message is only allowed to be a unicast MAC address (per the standard specification) and, furthermore, requires that the target MAC address is known to all intermediate devices. By extending the linktrace protocol to accom1nodate multicast destination addresses, and by allowing flooding for unknown unicast target MAC addresses, it is possible, as described herein, to enhance the conventional linktrace into an "exploratory linktrace" for the following purposes:

Dynamic in-band discovery of a VLAN active topology, without requiring an NMS to poll individual devices to assemble the topology map;

Discovery of network misconfiguration, e.g., where an administrator has not placed an MEP on a bridge, thereby leading to a "leaking" domain;

Troubleshooting of a service where one or more sites failed to ever come up, thereby rendering standard linktrace operation ineffective (because the intermediate bridges have never learned the target MAC address);

Tracing a path along which data packets with a particular destination MAC would be switched (forwarded) through the network, including points at which packets with an unknown unicast addresses would be flooded; and Obtaining information about why a particular port might not be forwarding packets sent on a particular VLAN with a particular destination MAC address.

Illustratively, the techniques described herein may be performed by hardware, software, and/or firmware, such as in accordance with an exploratory linktrace process 248, for example, in conjunction with bridging process 244. Depending upon which device is executing the process, such as an initiating network device, intermediate network device, or end point network device (e.g., MEP), the linktrace process 248 may be configured to respond in a different manner, accordingly. Also, the exploratory linktrace process 248 may be configured to operate in accordance with certain conventional protocols (e.g., 802.1ag), and in accordance with the techniques described herein (e.g., enhancements to the protocols).

In particular, as described herein, the embodiments herein define three messages for exploratory linktrace operations that are new or different from the standard linktrace operations. The first is an Exploratory Linktrace Message (ELM), which allows for transmission of a linktrace to a broadcast or multicast address. As such, an ELM may be forwarded in many directions instead of just one. As an ELM in this manner may produce a large number of replies/responses, the embodiments herein also define one or more mechanisms that are designed to reduce (or otherwise mitigate) the storm of replies generated by the ELM. For instance, an Exploratory Linktrace Reply (ELR) Message may be designed to reduce the number of individual replies by packing a number of replies from a single bridge into a single ELR message. Also, as described below, a new delay computation may allow the replying bridge to report back to the initiator how long it should wait for any replies from a next downstream hop, which may be jittered based on the size of the network (and thus, the number of replies that may be generated). Finally, a Directed Container Message (DCM) containing an encapsulated ELM, known collectively as a D-ELM, may be used to control discovery by further reducing the flood of ELMs and/or ELRs by unicasting a D-ELM to a specific bridge in the network, where it is converted to a linktrace message (e.g., ELM), and then propagated. Accordingly, with this enhancement, a network can be explored one part at a time.

C. Exploratory Linktrace Messages (ELMs)

The first enhancement to the standard linktrace protocol according to the embodiments herein is enabling the transmission of a linktrace message with a target address that is a unicast, broadcast, or multicast address. The associated message is referred to as an Exploratory Linktrace Message (ELM), which, unlike a standard linktrace message, is forwarded in many directions instead of just one, and may optionally trigger replies even from ports that do not forward the message.

Figure 3:
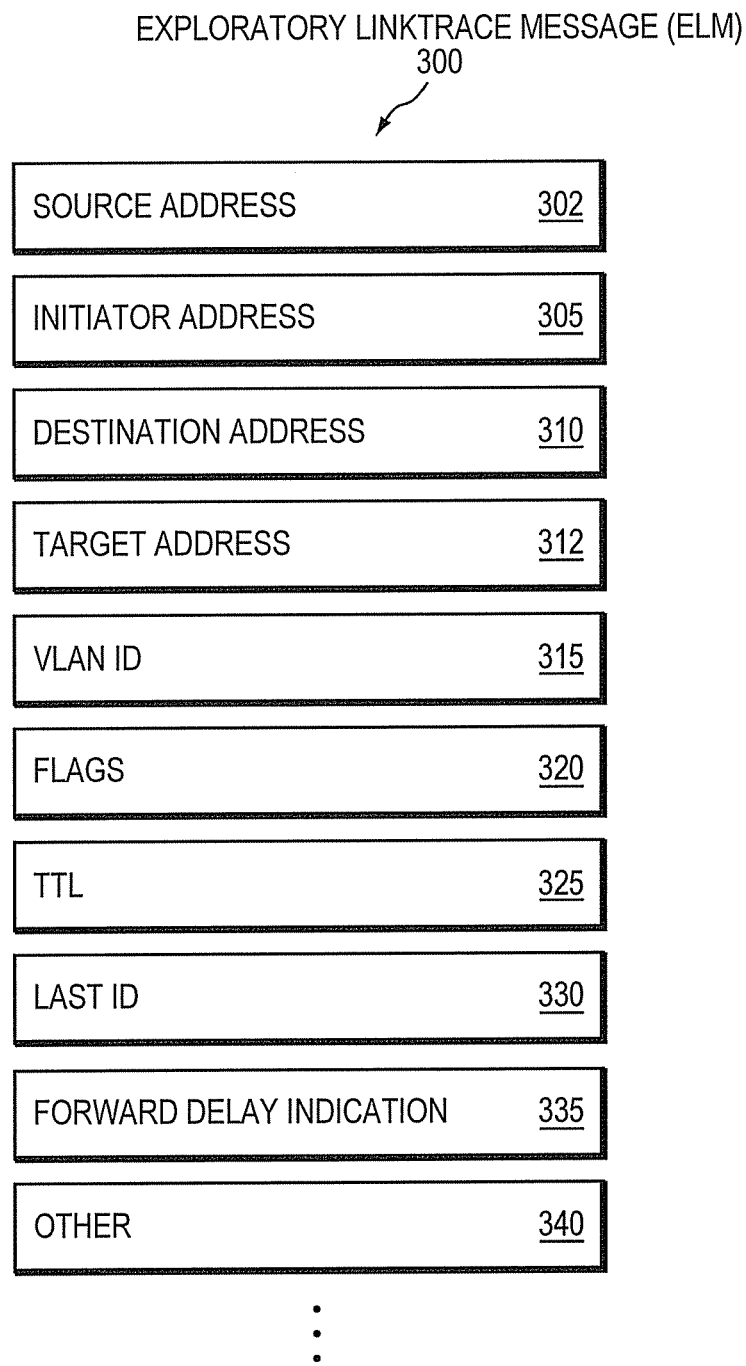
FIG. 3 illustrates an example exploratory linktrace message (ELM)

FIG. 3 illustrates an example simplified ELM that may be used in accordance with the techniques described herein. In particular, the ELM 300 may comprise, as understood by those skilled in the art and/or as described herein, a source address 302, an initiator address 305, a destination address 310 (e.g., a reserved MAC address to signify the exploratory linktrace), a target address 312 (to signify the scope of the exploratory linktrace), a VLAN identifier (VID or VLAN ID) field 315, a flags field 320, a TTL field 325, a last ID field 330 (of the device propagating the ELM to inform the next downstream devices of the ID of the device from which the ELM was received), a forward delay indication field 335, and other fields or payloads 340.

An ELM is originated from an MEP, herein referred to as an initiating network device or initiator (stored in field 305), that desires to initiate an exploratory linktrace. For instance, a network operator or administrator may manually trigger the exploratory linktrace operation, or the operation may be dynamically (automatically) triggered. The ELM 300 may be relayed (after modification) by all the MIPs it passes through (i.e., which are in the same Maintenance Association (MA) or VLAN, as will be understood by those skilled in the art), and is terminated by the MEPs that is reaches (i.e., in that MA or VLAN). It is forwarded everywhere a data packet with a destination address equal to the ELM's Target MAC address 312, with the same VLAN ID 315 as the ELM, would be forwarded.

Illustratively, an ELM 300 may be sent with a broadcast address as the Target MAC address 312, and the ELM may then follow and discover every path of the spanning tree until it hits MEPs in the same MA (e.g., of a particular VLAN or otherwise). Conversely, if the ELM Target MAC address 312 is a multicast or "group" address, then the ELM may also be forwarded through multiple ports from a single bridge. In particular, using a multicast/group address allows the ELM 300 to be propagated toward select members (participants in) the associated group (that is, on ports that have registered members of a multicast group). Finally, as described below, if the ELM Target MAC address 312 is a unicast address, then the ELM may be forwarded through a single port if it is known which port is associated with that address, or may be forwarded through multiple ports (i.e., "flooded") otherwise.

Figure 4:
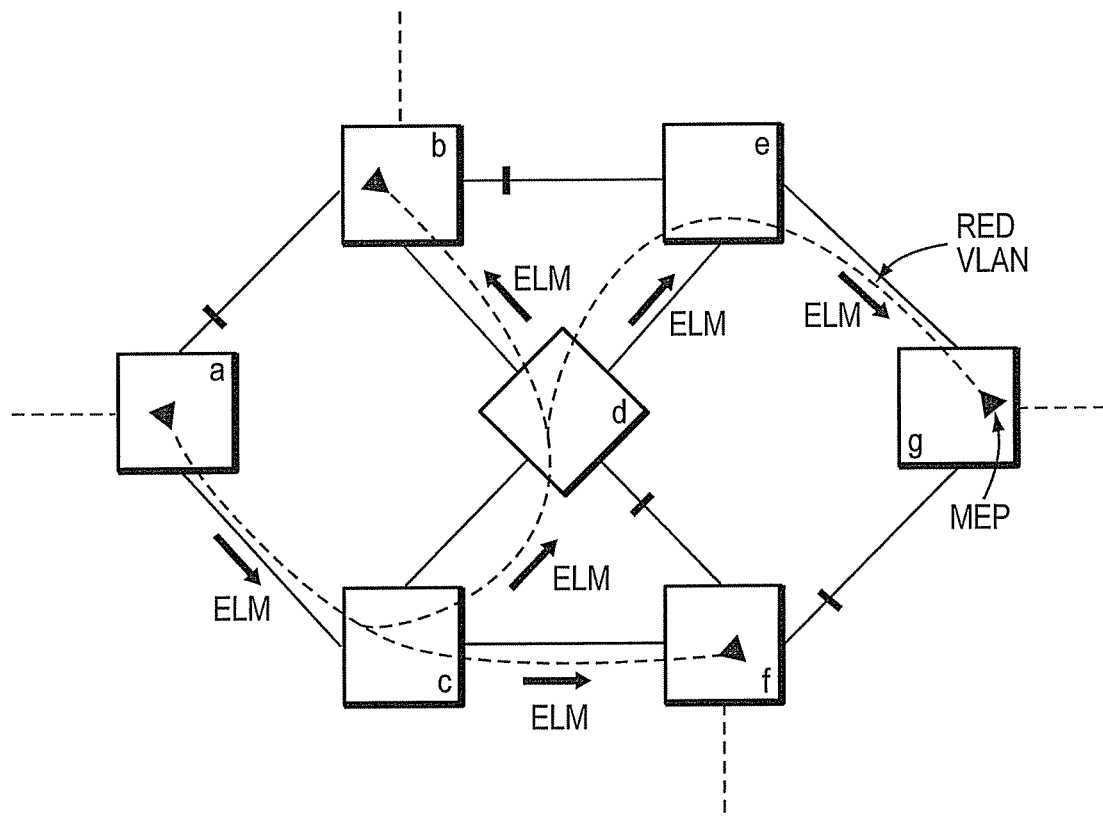
FIG. 4 illustrates an example propagation of ELMs.

FIG. 4 illustrates an example propagation of an ELM 300 through network 100 in accordance with one or more embodiments described herein. (Illustratively, a VLAN spanning tree, called a "RED VLAN", is shown as will be understood by those skilled in the art, and on which the ELM 300 may be propagated.) Similar to a linktrace message, an ELM at a particular Maintenance Level is forwarded as an ordinary broadcast or multicast data frame until it encounters an MEP at an equal or higher Maintenance Level, or an MIP at an equal level. An MEP at a higher Maintenance Level discards the ELM 300 without processing it, while an MEP/MIP at an equal level will process the ELM as a conventional linktrace message, with deviations from the standard being described herein. (Those skilled in the art will appreciate that while Maintenance Levels are CFM-specific, other techniques to propagate an ELM within a specific set of boundaries or domain may be utilized in accordance with the embodiments described herein.)

Specifically, any ELM 300 having a broadcast or multicast Target MAC address 312 is not discarded, contrary to the conventional standard. Also, as such, the ELM may be forwarded on all ports that are members of the VLAN in question, and are not blocked by STP or by VLAN color-blocking (e.g., MVRP or configuration restrictions, as will be understood), and do not have an MEP at an equal or higher Maintenance Level. The forwarding involves decrementing the TTL and replacing the source address 302 with that of the MEP/MIP per the standard. (In other words, in response to determining that the receiving bridge is an MIP and the TTL value 325 has not expired, the receiving bridge may propagate the ELM 300 to a plurality of downstream bridges based on the target address 312, accordingly.) Notably, as may be appreciated by those skilled in the art, the Exploratory Linktrace operation only ever makes use of the Forwarding Database (FDB); that is, the MIP continuity check database is not generally used for forwarding decisions.

Generally, the exploratory linktrace operation described thus far may produce a large number of linktrace replies. As described below, techniques may be used to reduce and/or otherwise mitigate the large number of replies.

D. Exploratory Linktrace Replies (ELRs)

The second enhancement described herein is designed to reduce the flood of replies (also referred to as a "storm"), so as not to overload the originating network device. This is done, for example, by packing a number of replies from a single bridge into a single message: an Exploratory Linktrace Reply (ELR). In particular, an ELR may be returned upstream toward the initiating network device, as described herein. If a bridge were to send conventional linktrace replies in response to an ELM, then that bridge would have to send one reply per egress port on which the ELM is forwarded. This is because the conventional linktrace reply carries information about a single egress port. Since a bridge may forward an ELM on hundreds of ports, this translates to hundreds of replies, which impact the performance of the bridge sending those replies and waste the bandwidth of the network. The ELR may thus be used to alleviate these issues. (Note that according to the techniques herein, an ELR may still be returned for each port, and that a concatenating ELR is merely one optional embodiment described herein.)

Figure 5:
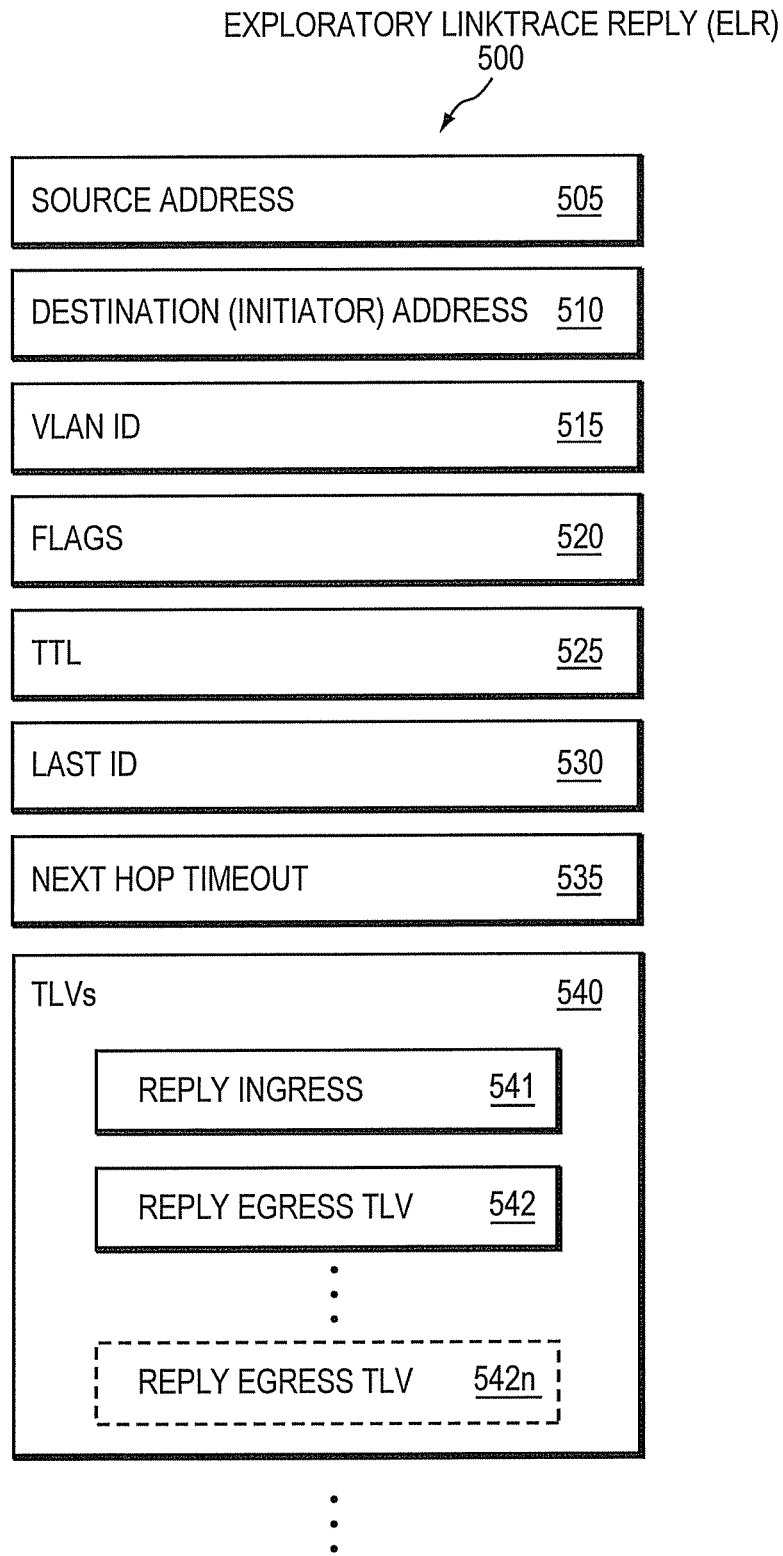
FIG. 5 illustrates an example exploratory linktrace reply (ELR)
Figure 6:
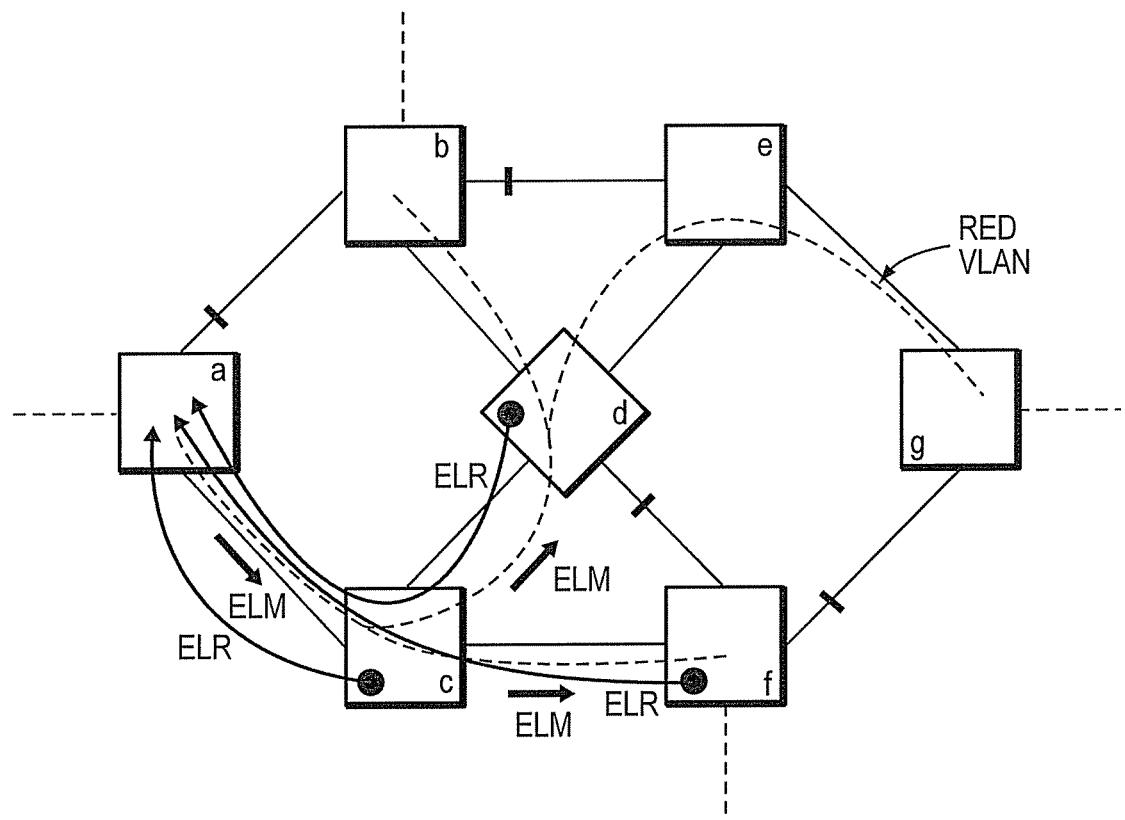
FIG. 6 illustrates an example return of ELRs.

FIG. 5 illustrates an example simplified ELR 500 that may be used in accordance with the embodiments herein. ELR 500 may comprise one or more fields, such as, inter alia, a source address 505 (of the responding network device), destination address 510 (of the initiating device to which the reply is to be forwarded), a VLAN ID field 515, a flags field 520, a TTL field 525, a last ID field 530 (to inform the initiating node from which upstream device was the corresponding ELM received), a next hop timeout field 535, and one or more TLVs 540, such as a reply ingress TLV 541 and one or more ELR Reply Egress TLVs 542 (through 542n as described herein) to indicate the ingress and egress ports of the ELM, respectively.

In accordance with one or more embodiments, an ELR 500 may carry a reply for every port that forwarded the ELM (e.g., in multiple TLVs 542n) and that has either an MIP or an MEP (i.e., facing in the correct direction) that is at the ELM's Maintenance Level, e.g., and is associated with the ELM's VLAN ID 315 (as noted above). The ELM may also optionally request replies from ports that did not forward the ELM (provided they have an appropriate Maintenance point as outlined above), allowing the exploratory linktrace to monitor the state of non-forwarding ports. The ELR 500 may thus concatenate a plurality of replies into one or more concatenated ELRs ("concatenating ELRs") to carry a plurality of linktrace replies in a single message (or multiple messages, as described below) to be returned upstream toward the initiating network device. That is, if replies for more than one egress port would be generated by the bridge in response to the ELM, then the bridge compacts the replies into one or more ELRs.

According to the techniques herein, the network device which received the ELM should attempt to fit as many ELR Reply Egress TLVs 542 into a single ELR 500, and may send multiple ELRs until all egress ports are reported to the ELM initiator (e.g., bridge 200a). That is, due to the size limitations or other restrictions (e.g., due to the hardware or software of the particular network device), the concatenated ELRs may need to be separated into a plurality of ELRs in order to relay all necessary information to the initiator. The receiving network device may set an appropriate flag field to indicate whether a particular ELR is the last reply or not. Accordingly, a bridge could, in theory, generate a very large number of ELRs, and these ELRs should be spaced out in time to some extent (e.g., jittered). For instance, an implementation may use a free running clock that triggers the bridge to send ELRs at a periodic interval (e.g. 1 second interval, jittered), up to a reasonable maximum number of messages per trigger (e.g. 10 messages). This jitter may also be used to jitter responses from multiple network devices receiving ELMs in the network, since as the ELM is propagated further into the network, more replies may be sent from network devices having similar distances from the initiating network device.

In other words, the time period over which the transmission of jittered reply messages may grow as the number of replies to be sent increases. For instance, each ELM may carry an indication (forward delay indication 335) of the maximum time that a network device receiving the ELM 300 is expected to wait before sending the corresponding reply, in order to prevent responders from replying faster than the initiator can process replies. That is, rate-limiting of replies is handled by carrying, in each ELM, an indication of the maximum time that the initiator expects the replying device to wait before sending a reply. This indication can be set to a fixed value by the operator (making all responders reply within a fixed timeout) or can be managed automatically, increasing as the ELM is sent throughout the network. According to the techniques described herein, that is, each responder may report back to the initiator the time that the next hop should wait, allowing the initiator to dynamically adjust the operation timeout, and this time may be used in a next ELM forward delay indication field 335. In particular, as a network size grows, and hence, as more ELRs will be sent, the ELRs may be spread out over a longer period of time. As such, the ELM may carry the forward delay indication field 335 (which may contain a time, a technique to compute the time, a maximum number of ELRs, or other metrics) to the next receiving network device, which may use this information along with the number of ELRs that this next receiving network device is to send to calculate a maximum time over which it should spread out the returning of its one or more ELRs.

This enhancement also involves the addition of a new next hop timeout field 535 in an ELR 500, allowing the replying network device to inform the initiating network device of an estimate of the delay for a next downstream network device to respond with an ELR for a next ELM. This allows the initiating bridge to dynamically adjust its timeout (i.e., how long it will wait for the last ELR to arrive) depending on the size (e.g., and/or fan-out) of the network. (As an alternative, a bit in flags field 520 may be included with an ELR 500 that indicates whether the ELR is a last reply to the ELM, such as from MEPs, so that the initiator may be sure it has received all replies before mapping the topology.)

Illustratively, therefore, the maximum timeout to use when sending an ELR (ELR timeout) is the maximum length of time the receiving network node should wait before sending a reply (e.g., randomly within that length of time to jitter the response), and may be determined based on locally determined information and the information in the ELM 300 (forward delay indication 335), which has been calculated by an upstream device and relayed to the initiator (next hop timeout field 535). The metrics and delay calculations that may be used to compute the delays may be a constant delay (i.e., each device uses the same delay), or other adjustable delay, such as a logarithmic equation based on the fan-out at each network device. That is, based on how many egress ports are to receive the next ELM, the next-hop devices may be told to use a specific delay to accommodate that number of replies being transmitted to the initiator. Other delay calculations aside from logarithmic calculations may be used in accordance with the techniques described herein (e.g., constant, linear, etc.), and the use of a logarithmic calculation is not meant to be limiting to the scope of the embodiments herein.

Notably, the ELM 300 may include information (e.g., bits in the Flags field 320, etc.) that indicate to a receiving bridge on which ports should a reply be generated. Generally, the receiving bridge should only return a reply for ports on which the ELM is propagated. However, the receiving bridge may be instructed by the ELM to return replies from ports on which the ELM is not propagated. For example, the bridge may be instructed to return replies for particular ports not propagating the ELM based on one or more port characteristics, such as those ports that are not in the ELM's VID member set, down ports, ports blocked by STP protocol, ports that do not forward to the particular target, e.g., multicast, address, etc.). This additional feature allows for additional discovery of the network (e.g., outside of a given VLAN), while the former functionality of the protocol merely allows discovery of the active topology (e.g., of a given VLAN).

E. Topology Mapping

When the initiating MEP receives the ELR messages, it is capable of constructing a topology tree just as for conventional linktrace replies as defined in 802.1 ag, since an ELR effectively packs multiple replies in a single message. That is, a device receiving the ELRs can use the ELR TTL field 525 to order the replies and figure out the sequence of the bridges in the network. Furthermore, the receiving device can rely on the ELR TLV s 540 to discover how the devices are connected together. This is similar to how path discovery is performed by an MEP in IEEE Std. 802.1ag, except that as described herein, an entire topology tree or VLAN topology tree is constructed, as opposed to a single path to a single destination.

Notably, the network topology may be generated based on the ELRs subsequent to transmitting an ELM with a final TTL (e.g., where a maximum distance is desired), or receiving an ELR from all MEPs at the boundaries of the maintenance area. Also, a "nextLTMTransID" (as defined in the standard 802.1ag) should be retained for a period of time that is longer than the standard minimum of 5 seconds, to accommodate for discovery of multiple paths within the network. In particular, the 5-second timeout may be restarted whenever an ELR is received that indicates that it is not the last ELR to be emitted by the replying bridge in response to this ELM.

Figure 7:
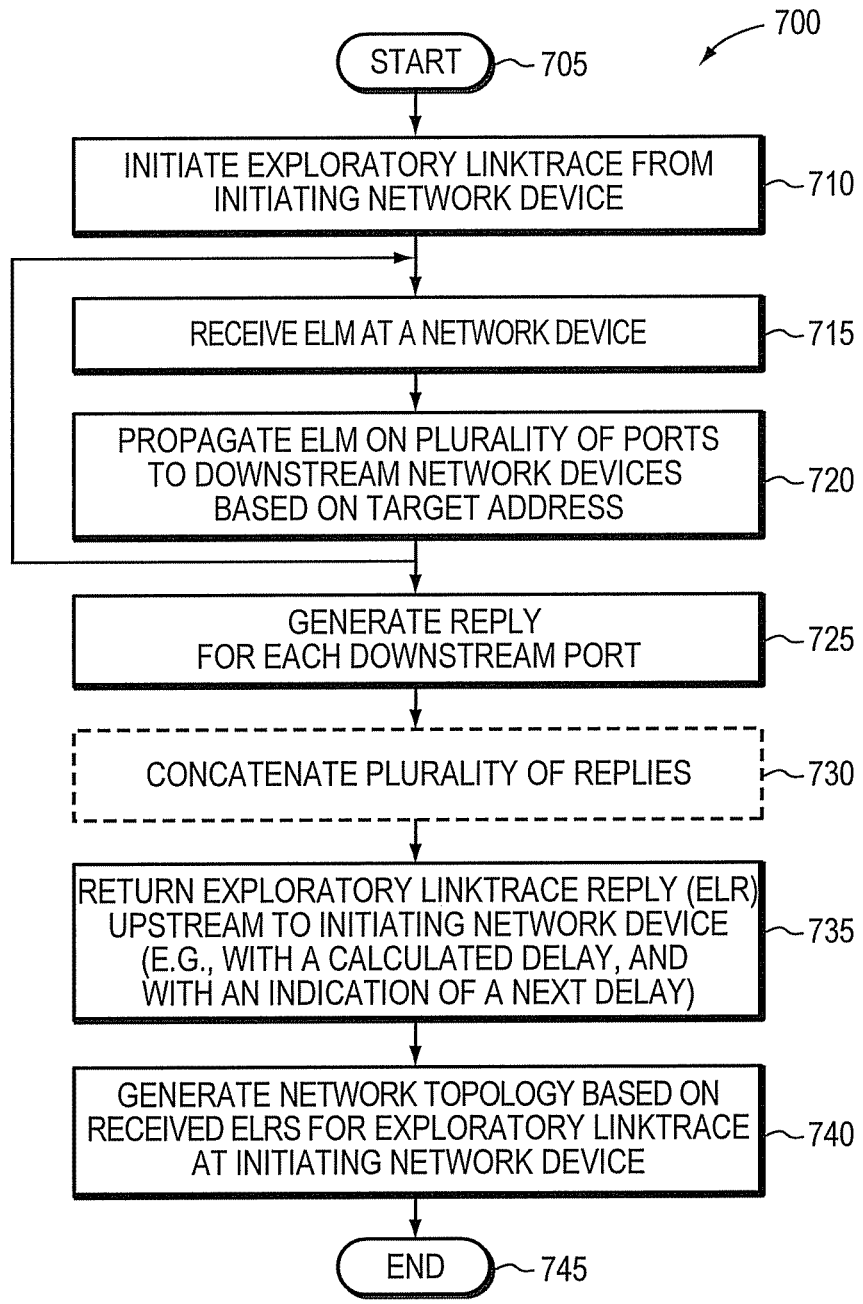
FIG. 7 illustrates an example procedure for exploratory linktrace.

FIG. 7 illustrates an example procedure for exploratory linktrace in accordance with one or more embodiments described herein. The procedure 700 starts at step 705, and continues to step 710, where an exploratory linktrace is initiated from an initiating network device (e.g., bridge 200a) by transmitting an exploratory linktrace message (ELM) 300. The ELM may be received at network devices (bridges) in step 715, and in step 720 the receiving device propagates the ELM to a plurality of ports to downstream network devices based on target address, as described above. In step 725, the receiving network device may consequently generate a reply for each downstream port, such as described above, optionally concatenating a plurality of replies into one or more concatenating ELRs in step 730. In step 735, the network device may return the ELRs (or concatenating ELR) upstream to the initiating network device (e.g., within a calculated delay, and with an indication of a next delay, as mentioned above). In step 740, the initiating network device may generate a network topology, accordingly, and the exploratory linktrace procedure 700 ends in step 745. (Those skilled in the art will appreciate that procedure 700 is a simplified procedure illustrating key differences between conventional linktrace operation and the exploratory linktrace operation described herein, and is not meant to be limiting to the scope of the embodiments herein.)

F. Controlled Discovery-Directed Exploratory Linktrace Messages (D-ELMs)

A third enhancement to the standard linktrace protocol, referred to herein as "controlled discovery," further reduces the flood of replies by unicasting a Directed ELM (DELM) to a specific bridge in the network, where it is then converted to an ELM and propagated. With this enhance1nent, a network can be explored one part at a time. In particular, this enhancement allows an arbitrary CFM PDU (protocol data unit) to be carried in a container message to a particular maintenance point in the network, where it can be unpacked and undergo further processing, being forwarded as appropriate. Controlled discovery, therefore, may be achieved by unicasting a container message having an ELM to a specific bridge in the network, where the encapsulated ELM is unpacked ("decapsulated") and then propagated.

Figure 8:
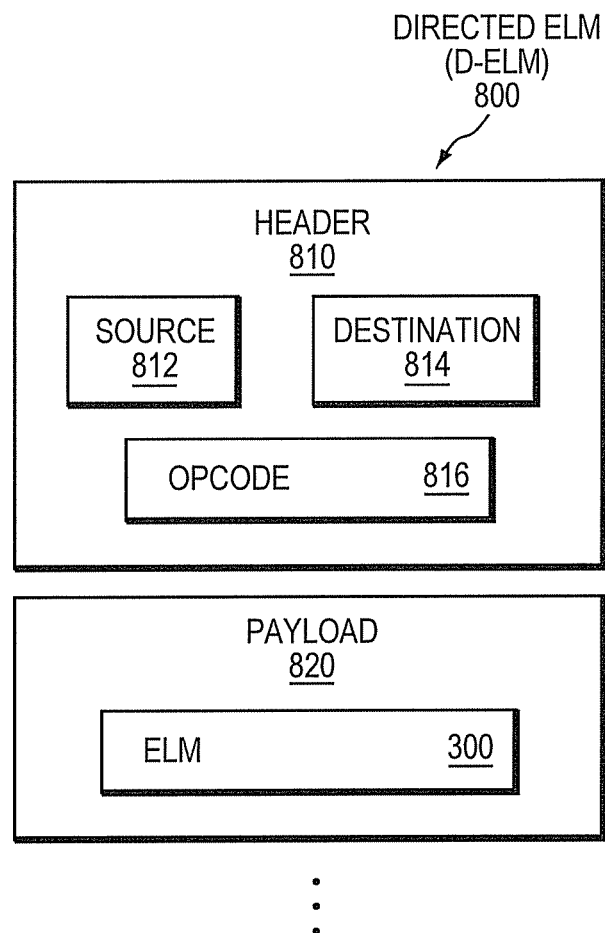
FIG. 8 illustrates an example directed-ELM (D-ELM)

FIG. 8 illustrates an example simplified container message, particularly a D-ELM 800, that may be used in accordance with one or more embodiments described herein. The D-ELM 800 generally comprises a conventional header 810 having source and destination addresses 812 and 814, for the initiating network device, and the particular network device requested to begin the exploratory linktrace operation, respectively. In addition, an opcode 816 may define the message 800 as a D-ELM, such that the destination device may determine that the payload 820 comprises an encapsulated ELM 300.

The capability of a D-ELM 800 thus allows the user to defer the starting point of the path discovery process (the exploratory linktrace) from simply the next-hop node to an arbitrary node in the network (that might be several hops away). It is as if the ELM is "tunneled" from the originator/initiator to a designated "starting point" where the regular ELM processing commences.

Figure 9:
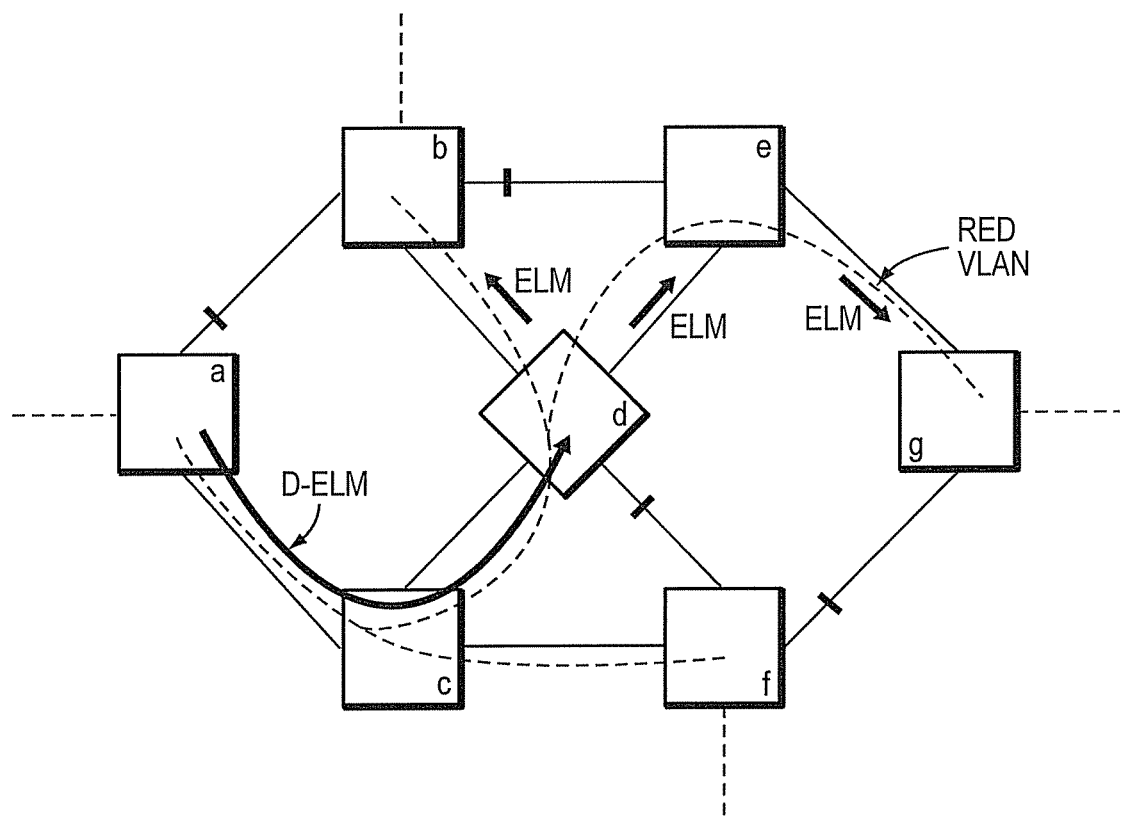
FIG. 9 illustrates an example propagation of a D-ELM.

FIG. 9 illustrates an example of a D-ELM 800 being used to tunnel an ELM 300. A Directed Exploratory Linktrace operation may be performed by an initiator (e.g., bridge 200a), where an ELM 300 is encapsulated in a DCM, which is directed to a particular maintenance point (e.g., bridge 200d) in the network and passed as a regular data frame. When the particular maintenance point receives the DCM, the ELM is unpacked and treated as if it had just been received at the maintenance point. This leads to the ELM being forwarded away from the MEP that initiated the D-ELM 800, so that the network beyond that point can be explored.

Figure 10:
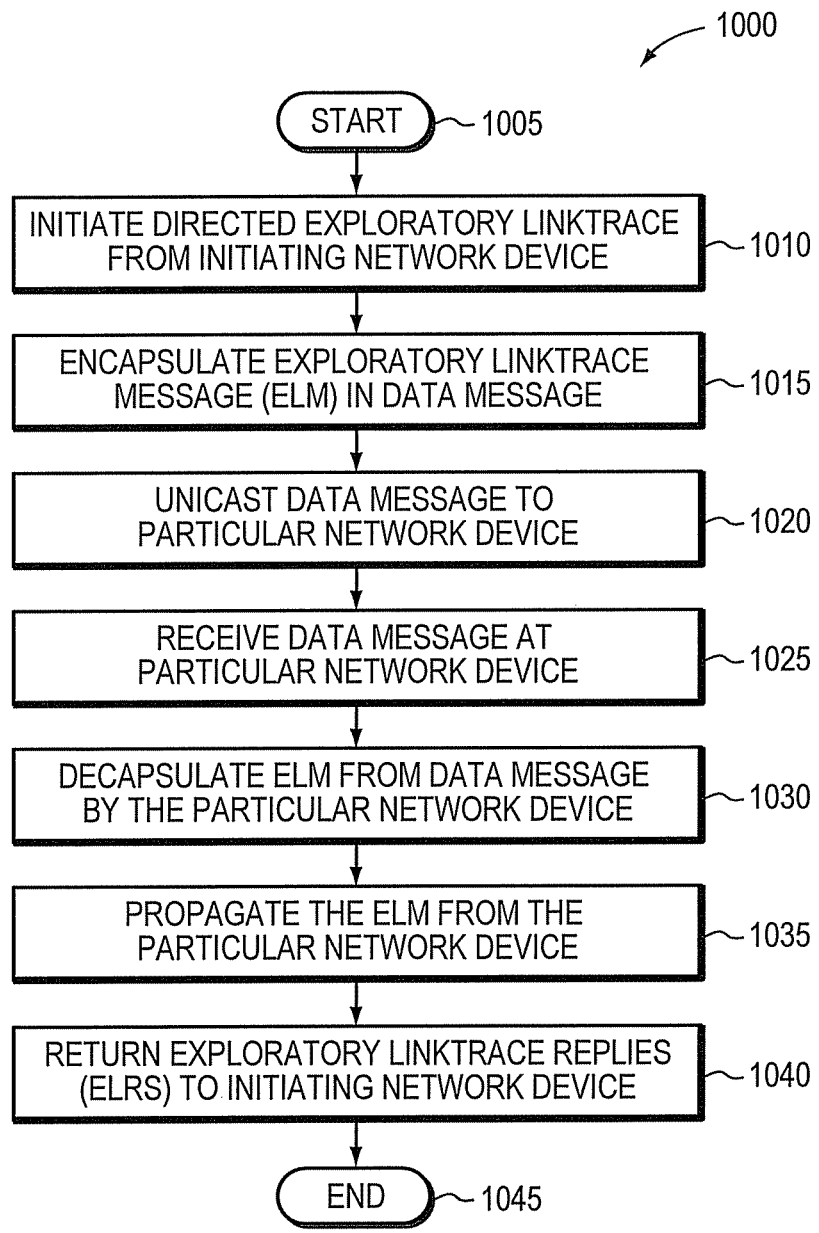
FIG. 10 illustrates an example procedure for directed exploratory linktrace.

For instance, FIG. 10 illustrates an example procedure for a directed exploratory linktrace in accordance with one or more embodiments described herein. The procedure 1000 starts at step 1005, and continues to step 1010, where a directed exploratory linktrace may be initiated from initiating network device (e.g., bridge 200a), which in step 1015 encapsulates the ELM 300 in a data message, particularly, D-ELM 800. The data message (D-ELM) may be unicast to the particular network device (e.g., bridge 200d) in step 1020, which receives the data message in step 1025. The particular network device may then decapsulate the ELM 300 from data message 800 in step 1030, and may then propagate the ELM in step 1035. Note that any ELRs are sent back to the initiating device in step 1040, not to the particular device that decapsulated the D-ELM. The procedure 1000 ends in step 1045 (illustratively, continuing to FIG. 7 above, to continue the exploratory linktrace techniques from the particular network device).

G. Closing Remarks

Advantageously, the novel techniques described herein provide for an exploratory linktrace operation in a computer network. By allowing for broadcast and multicast ELMs and managing reply storms (e.g., by concatenating replies in ELRs, delaying ELRs, etc.) the novel techniques expand the functionality of conventional linktrace operations. Also, the dynamic aspects of one or more embodiments described herein alleviate the need for cumbersome and inefficient manual configuration. In particular, the exploratory linktrace techniques described above are useful for various network management applications, such as provisioning tools (e.g., to provide post-provisioning verification) and diagnostics and troubleshooting tools (e.g., for fault isolation/verification).

For example, the exploratory linktrace features allows dynamic in-band discovery of VLAN active topology, without requiring an NMS to poll individual devices to assemble a topology map. Also, the features allows discovery of network misconfiguration, such as where an operator/administrator forgot to place an MEP on a bridge, thereby leading to a "leaking" CFM domain. Further, the features allow troubleshooting of a service where a site/device failed to ever come up, thereby rendering standard linktrace operations useless (e.g., because intermediate bridges have never learned the target MAC address).

While there have been shown and described illustrative embodiments that provide an exploratory linktrace in a computer network, it is to be understood that various other adaptations and modifications may be made within the spirit and scope of the present invention.

For example, the embodiments have been shown and described herein in relation to the linktrace protocol described in IEEE Std. 802.1ag. However, the embodiments of the invention in their broader sense are not so limited, and may, in fact, be used with any suitable linktrace protocol or traceroute protocol, as appropriate. Also, while the directed messages have been described above specifically for ELMs, any directed CFM message may also be generated and transmitted, e.g., in conjunction with other linktrace operations. Moreover, while references to Ethernet networks, and CFM linktrace operations are made, the techniques may be applied to any suitable computer network and under any suitable management scheme.

Figure 11:
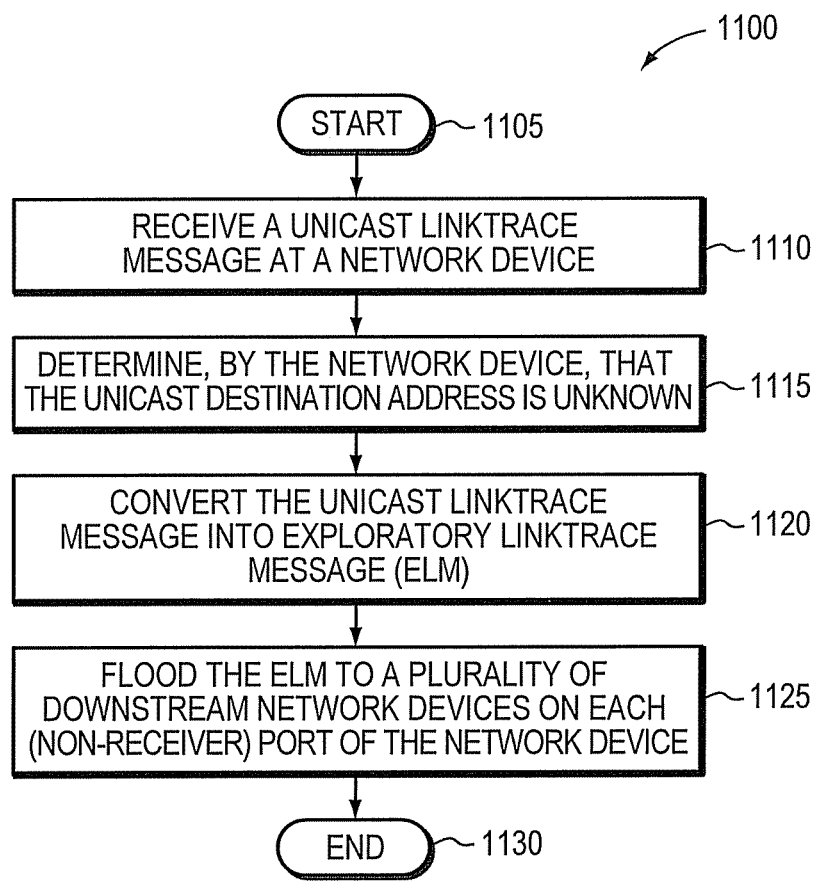
FIG. 11 illustrates an example procedure for a hybrid exploratory linktrace model.

Furthermore, the techniques described above detail exploratory linktrace operations as a standalone operation. However, the embodiments herein are not as limited, and may be used in a "hybrid" fashion where both a conventional linktrace and an enhanced exploratory linktrace operation may be used. For instance, FIG. 11 illustrates an example procedure for a hybrid linktrace operation in accordance with one or more additional embodiments described herein. The procedure 1100 starts at step 1105, and continues to step 1110, where a network device receives a conventional unicast linktrace message. Then, in step 1115, if the network device determines that the unicast target address is unknown, it may (in step 1120) convert the linktrace message into an ELM 300, and may flood the ELM (in step 1125) to a plurality of downstream network devices on each (non-receiver) port of the network device. In other words, the network device (MIP) receiving a linktrace message to an unknown MEP destination address may flood the message in a conventional manner, but may do so in accordance with exploratory linktrace operations described herein for the reasons described above. The procedure 1100 ends in step 1130 (illustratively, continuing to step 720 of FIG. 7 above, to continue the exploratory linktrace techniques).

Effectively, the hybrid operation is similar to the directed exploratory linktrace techniques described above, with the exception that in the hybrid operation, the first portion of the linktrace is a conventional unicast linktrace, and not an encapsulated linktrace.

However, the similarity is based on the fact that one particular network device (MIP) begins transmitting the ELM (where in the hybrid model, this MIP is the one without knowledge of the unicast destination MEP, while in the directed linktrace model, this MIP is the one decapsulating the ELM). The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
  receiving a unicast data message directed to a destination network device, the data message encapsulating an exploratory linktrace message (ELM) from an initiating network device;
  decapsulating the ELM from the data message;
  propagating the ELM on a plurality of ports of the destination network device;
  obtaining an exploratory linktrace reply (ELR) for each of the plurality of ports of the destination network device to produce a plurality of ELRs; and
  sending the plurality of ELRs to the initiating network device.

2. The method of claim 1, wherein the plurality of ELRs are sent to the initiating network device within a maximum response time.

3. The method of claim 2, wherein the maximum response time is based on a number of egress ports on the destination network device.

4. The method of claim 2, further comprising informing the initiating network device of a maximum response time for a next downstream network device to respond with an ELR.

5. The method of claim 2, wherein the ELM comprises a delay indication field including at least one of a maximum response time, a technique for computing the maximum response time, or a maximum number of ELRs.

6. The method of claim 1, wherein the sending does not send the plurality of ELRs to the destination network device that performed the decapsulating.

7. The method of claim 1, wherein the ELM is a Directed ELM.

8. The method of claim 1, wherein the ELM includes a source address of the initiating network device and a destination address of the destination network device.

9. The method of claim 8, wherein the ELM includes an opcode identifying the ELM as a Directed ELM.

10. The method of claim 1, wherein the ELM includes an opcode identifying the ELM as a Directed ELM.

11. A non-transitory computer readable media storing instructions that when executed by a processor cause the processor to perform operations comprising:
receiving a unicast data message directed to a destination network device, the data message encapsulating an exploratory linktrace message (ELM) from an initiating network device;
decapsulating the ELM from the data message;
propagating the ELM on a plurality of ports of the destination network device;
obtaining an exploratory linktrace reply (ELR) for each of the plurality of ports of the destination network device to produce a plurality of ELRs; and
sending the plurality of ELRs to the initiating network device.

12. The media of claim 11, wherein the plurality of ELRs are sent to the initiating network device within a maximum response time.

13. The media of claim 12, further comprising informing the initiating network device of a maximum response time for a next downstream network device to respond with an ELR.

14. The media of claim 12, wherein the ELM comprises a delay indication field including at least one of a maximum response time, a technique for computing the maximum response time, or a maximum number of ELRs.

15. The media of claim 11, wherein the maximum response time is based on a number of egress ports on the destination network device.

16. The media of claim 11, wherein the sending does not send the plurality of ELRs to the destination network device that performed the decapsulating.

17. The media of claim 11, wherein the ELM is a Directed ELM.

18. The media of claim 11, wherein the ELM includes a source address of the initiating network device and a destination address of the destination network device.

19. The media of claim 18, wherein the ELM includes an opcode identifying the ELM as a Directed ELM.

20. The media of claim 11, wherein the ELM includes an opcode identifying the ELM as a Directed ELM.

* * * * *